Nov. 22, 1960 — W. F. C. SCHAAP — 2,960,972
APPARATUS FOR VAPOR GENERATING AND SUPERHEATING
WITH RECIRCULATED GAS FLOW CONTROL OF REHEAT
Filed April 21, 1955 — 5 Sheets-Sheet 1

INVENTOR.
WILLEM F. C. SCHAAP
BY
ATTORNEY

Nov. 22, 1960 W. F. C. SCHAAP 2,960,972
APPARATUS FOR VAPOR GENERATING AND SUPERHEATING
WITH RECIRCULATED GAS FLOW CONTROL OF REHEAT
Filed April 21, 1955 5 Sheets-Sheet 3
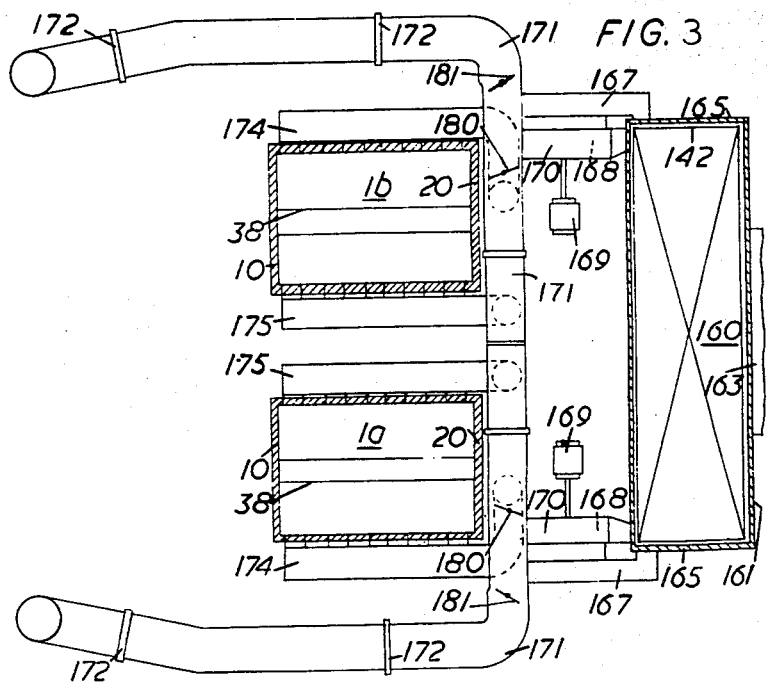
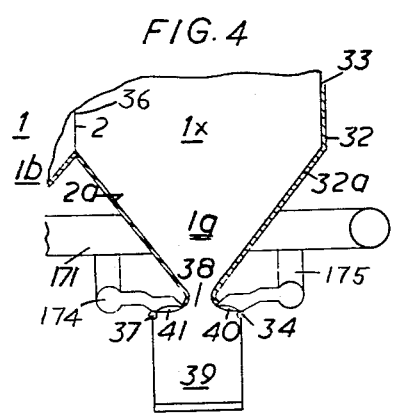
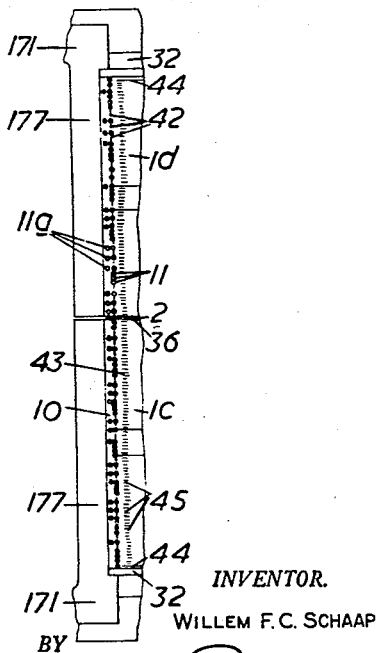
INVENTOR.
WILLEM F.C. SCHAAP
BY
ATTORNEY

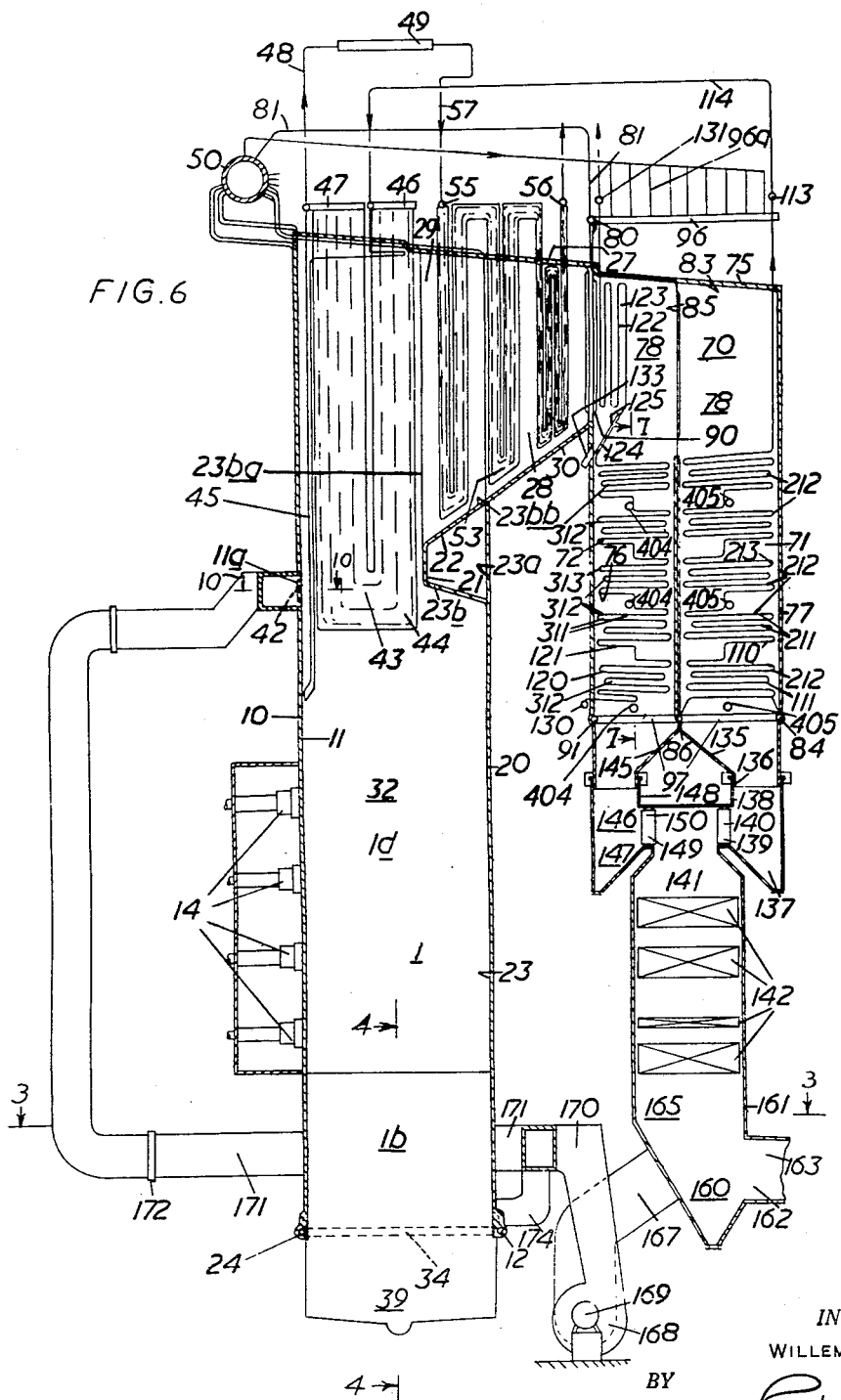

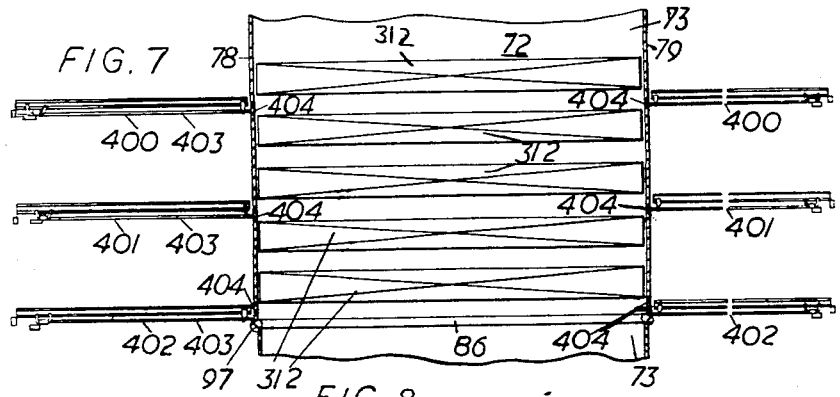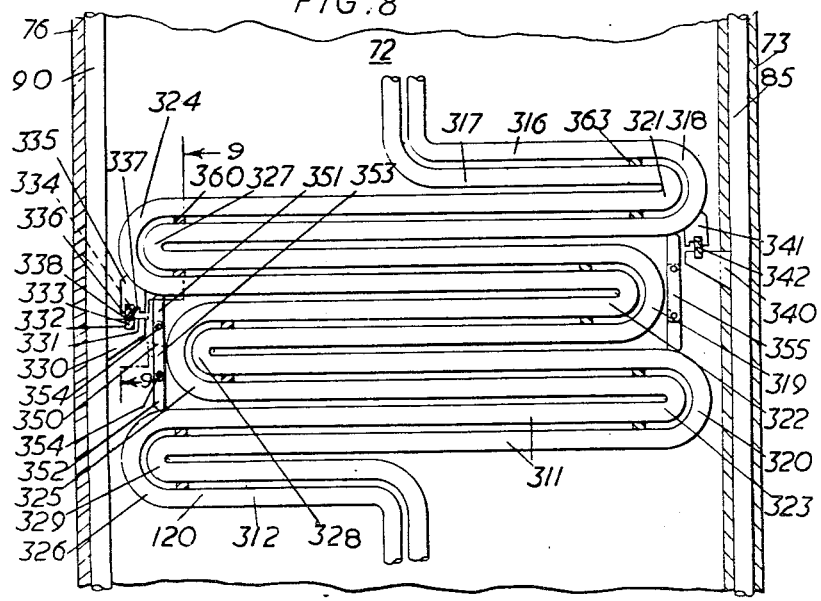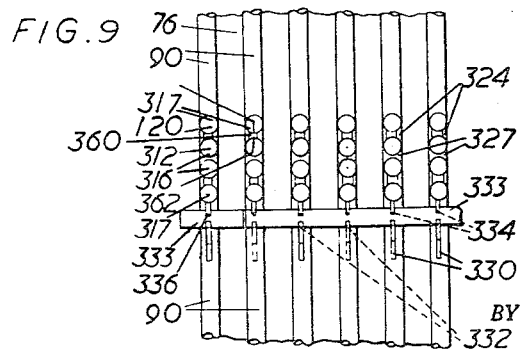

United States Patent Office 2,960,972
Patented Nov. 22, 1960

2,960,972

APPARATUS FOR VAPOR GENERATING AND SUPERHEATING WITH RECIRCULATED GAS FLOW CONTROL OF REHEAT

Willem F. C. Schaap, London, England, assignor to The Babcock & Wilcox Company, New York, N.Y., a corporation of New Jersey Filed Apr. 21, 1955, Ser. No. 502,815

Claims priority, application Great Britain May 24, 1954

2 Claims. (Cl. 122—478)

This invention relates to tubulous vapor generating and vapor heating units and to methods of operation thereof and more particularly to high capacity units for supplying stream at high pressure and high temperature. In the pursuit of efficiency in central station turbo-generator plants the vapor pressures and temperatures used have become progressively higher and reheating between turbine stages has been adopted. From considerations of safety and efficiency the proper regulation of vapor temperature is important. The difficulty of maintaining a proper temperature of reheat is somewhat greater than that of maintaining a proper temperature of superheat, since, while the vapor enters the superheater at an approximately constant temperature, the vapor entering the reheater has a temperature load characteristic which falls as the load decreases.

An object of the invention is the provision of vapor generating units adapted to give improved load-reheat temperature characteristics. Another object is the provision of an advantageous method of operating such units for the purpose of regulating the temperature of reheat. A further object is to provide an improved arrangement of the component elements of a vapor generating and vapor heating unit.

The present invention includes a tubulous vapor generating and vapor heating unit having a radiant vapor generating section including a furnace chamber with vapor generating wall cooling tubes, radiant vapor superheating means disposed in a passage for the flow of hot gases from the furnace chamber and adapted to extract heat from the hot gases flowing through the passage mainly by radiation, convection vapor superheating means and convection vapor reheating means disposed in the gas flow path beyond the said vapor superheating means and adapted to extract heat from the hot gases mainly by convection, and means for recirculating furnace gases cooled by contact with convection vapor heating surfaces to a gas mixing region adjacent the inlet to the said passage.

The invention also includes a tubulous vapor generating and vapor heating unit having a radiant vapor generating section including a furnace chamber with vapor generating wall cooling tubes, vapor superheating means with tubes relatively widely spaced across a passage for the flow of gases from the furnace chamber, convection heat exchange means beyond the said superheating means including convection superheating means and convection reheating means, both convection heating means having tubes relatively narrowly spaced transversely of the direction of gas flow, and means for recirculating furnace gases cooled by contact with convection vapor heating surfaces to a gas mixing region adjacent the inlet to the said passage.

The invention furthermore includes a tubulous vapor generating and vapor heating unit having a radiant vapor generating section including a furnace chamber with vapor generating wall cooling tubes, superheating means with tubes relatively widely spaced across a passage for the flow of gases from the furnace chamber, convection superheating means and convection reheating means disposed in separate parallel furnace gas flow passes beyond the passage with their tubes relatively narrowly spaced across the respective passes, damper means for controlling gas flow distribution between the passages, and means for recirculating furnace gases cooled by contact with convection vapor heating surfaces to a gas mixing region adjacent the inlet to the said passage.

The invention also includes the method of operating a unit as described in any one of the three preceding paragraphs, the method including recirculating of cooled gases to the said region to decrease the heat absorbed by the vapor superheating means in the passage and increase heat absorbed by the convection reheating means as the load decreases and controlling the recirculation in order to regulate the final temperature of reheat.

The invention moreover includes the method of operating a tubulous vapor generating and vapor heating unit over an upper range of vapor generating loads on the unit which includes passing a stream of hot gases first over a radiant superheater and then over a convection superheater and a convection reheater, passing steam to be superheated through the superheaters, effecting attemperation of the superheated steam to reduce its temperature to a desired optimum superheat temperature, passing stream to be reheated through the reheater, recirculating a part of the hot gases, cooled by contact with convection vapor heating surfaces, to a gas mixing region adjacent the gas inlet end of the radiant superheater and controlling the mass flow rate of the recirculated gases to maintain the tempuerature of the reheated steam at a desired optimum reheat temperature.

A constant problem in the operation of tubulous vapor generators is the removal of deposits from the outer surfaces of the tubes. In large units, difficulties arise in reaching all of the surfaces by means of soot blowers even when soot blowers of the type having an element projectable from a retracted position are used. In this connection, the necessity of placing the soot blowers so that their movements are transverse to the tubes should be borne in mind. In order to provide the large superheating and reheating surfaces required to afford high temperatures of superheat and reheat, horizontal tube lengths may be used which are so elongated as to necessitate supports intermediate their ends, such supports entailing upright suspension tubes. The use of intermediate supports, however, aggravates the problem of cleaning, since deposits tend to find lodgement at the locations where the horizontal and suspension tubes cross.

Another object of the invention is the provision of an arrangement of superheater and reheater surfaces in upright parallel gas passes advantageous from the points of view of the provision of a large area of superheater and reheater surfaces and the maintenance of cleanliness of those surfaces.

The present invention also includes a tubulous vapor generating and vapor heating unit having two upright gas passes disposed in parallel as regards gas flow and respectively containing at least one superheater tube bank comprising horizontal or substantially horizontal tube lengths and at least one reheater tube bank including horizontal or substantially horizontal tube lengths, wherein each pass the said tube lengths are unsupported by suspension tubes intermediate their ends and are parallel or substantially parallel to outer walls of the pass through which are adapted to operate lance type soot blowers with discharge elements arranged to be projected inwardly from, and to be withdrawn to, retracted positions, and during movement to discharge fluid for cleaning the said tube bank or banks within the pass, while in at least one of the passes the tube bank or each tube bank extends substantially from one to the other of the said outer walls.

The invention also includes a tubulous vapor generating and vapor heating unit with a lateral gas passage containing vapor heating means and connecting an upper region of a furnace chamber to the upper ends of two upright gas passes disposed in parallel as regards gas flow and respectively containing at least one superheater tube bank comprising horizontal or substantially horizontal tube lengths and at least one reheater tube bank comprising horizontal or substantially horizontal tube lengths, one of the parallel gas passes being disposed at that side of the other of the parallel gas passes remote from the furnace chamber and the tube lengths in each pass being unsupported by suspension tubes intermediate their ends and parallel or substantially parallel to outer walls of the pass transverse to wall means between the said passes, in at least one of which the tube bank or each tube bank extends substantially from one to the other of the said outer walls.

The invention will now be described, by way of example, with reference to the accompanying diagrammatic drawings, in which:

Fig. 3 is a sectional plan view taken on the line 3—3 of Fig. 6;

Fig. 4 is a sectional front elevation of a lower part only of a furnace chamber shown in Fig. 6, taken on the line 4—4 of that figure;

Fig. 6 is a sectional side elevation of a tubulous, vapor generating, superheating and reheating unit adapted to raise steam;

Fig. 7 is a fragmentary view taken on the line 7—7 of Fig. 6;

Fig. 8 is a fragmentary side view showing supporting means for a horizontal bank of reheater tubes of the unit;

Fig. 9 is a fragmentary view taken on the line 9—9 of Fig. 8; and

Fig. 10 is a sectional plan view taken on the line 10—10 of Fig. 6.

Figures 1, 5:
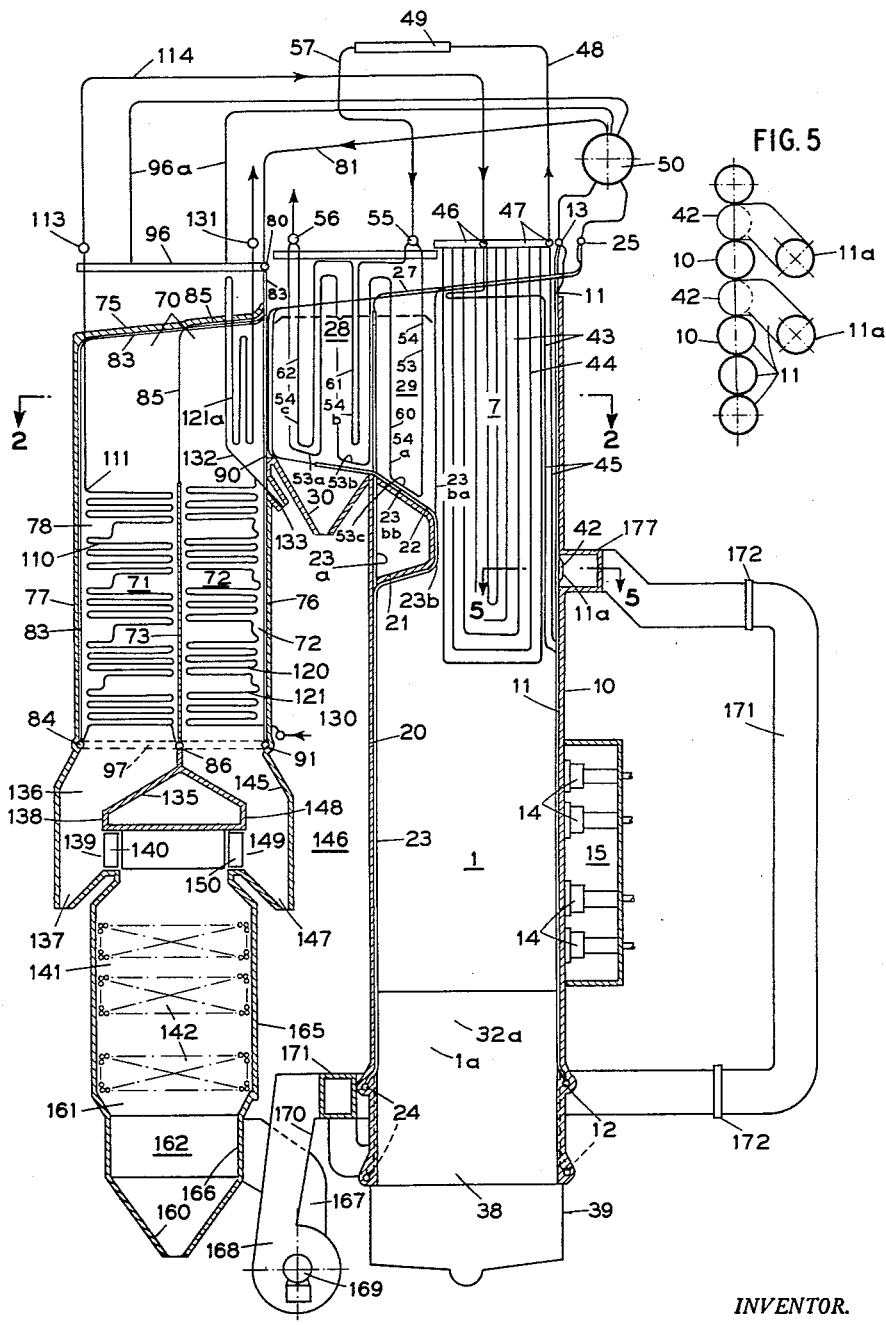
Fig. 1 is a sectional side elevation, taken on the line 1—1 of Fig. 2, of a tubulous steam generating, superheating and reheating unit.
Fig. 5 is a sectional plan view of a small part only of a furnace chamber front wall, taken on the line 5—5 of Fig. 1.
Figure 2:
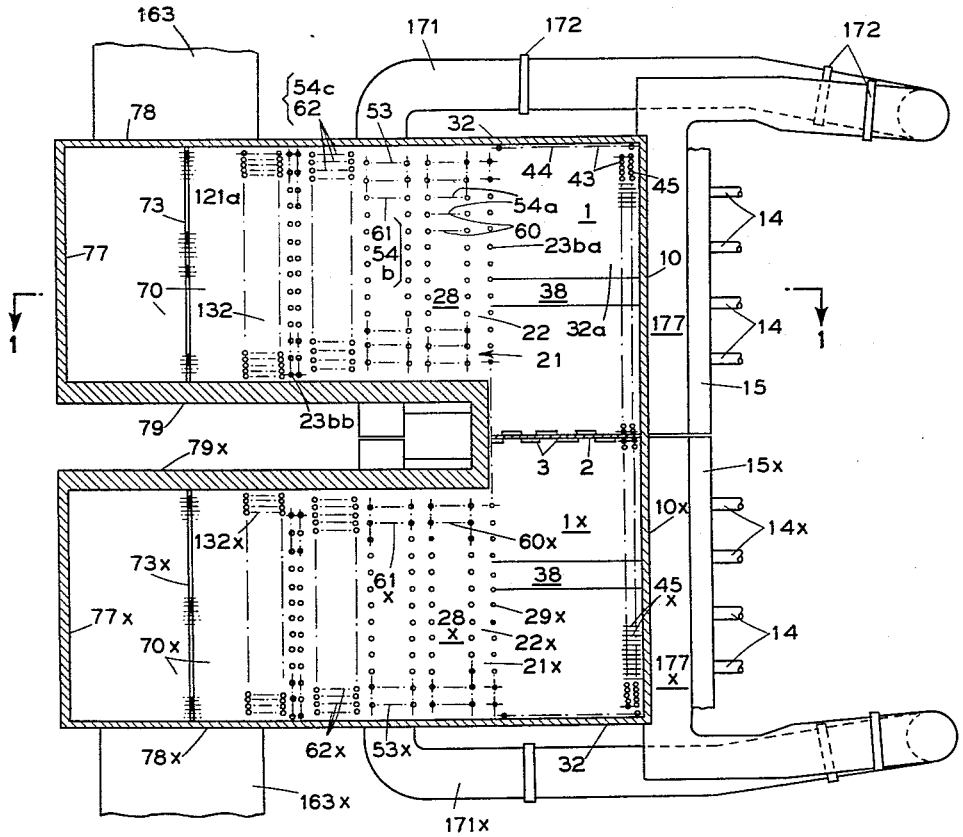
Fig. 2 is a sectional plan view taken on the line 2—2 of Fig. 1.

The unit illustrated in Figs. 1 or 6 is one adapted to give a high output of steam at high pressure and high temperatures of superheat and reheat and includes a vertically elongated furnace 1 having two furnace chambers and disposed side by side and separated by a tubulous partition wall 2 which is provided with ports (not shown) adapted to limit the effect on the wall 2 of pressure differences between the furnace chambers during operation. The furnace 1 has front, rear and side walls 10, 20 and 32 lined with steam generating wall cooling tubes, which tubes and the tubes of the partition wall 2 are suitably arranged in a circulatory system including lower headers, such as the headers 12, 24, 34 and 37, and an upper steam and water drum 50 which includes steam and water separating means of known form and the water space of which is suitably connected by downcomers to the lower headers of the circulatory system.

The front wall 10 of the furnace 1 is vertical throughout its height and four vertically spaced horizontal rows of fuel burners 14 of suitable known type are arranged to discharge fuel entrained in a stream of combustion air into the furnace between tubes 11 lining the wall 10 and towards the rear wall 20. Each row of the burners 14 includes eight burners, four of which are arranged to discharge into one furnace chamber while the remainder are arranged to discharge into the other furnace chamber.

At some distance above the level of the uppermost row of the burners 14, the rear wall 20 of the furnace 1 is formed with an arch 21 projecting forwardly for approximately one-third the depth of the furnace and having an upper surface 22 which slopes upwardly and rearwardly. The rear wall 20 is lined with steam generating tubes 23 which at the base of the arch 21 divide into two groups, the first group 23a extending vertically upwards at the back of the arch to and through a roof 27, which roof extends rearwardly from the front wall 10 over the furnace 1 and over a passage 28 leading rearwardly from a gas outlet 29 at the top of the furnace 1, the tubes of the group 23a then extending, to line that part of the roof 27 above the furnace 1, forwardly to the front wall 10. Thence these tubes extend to the steam and water drum 50. A second group 23b of the tubes 23 line the lower and forward surfaces of the arch 21, some of these tubes indicated at 23–ba extending upwardly from the forward end of the arch to the roof 27 to form a screen of spaced tubes which extends across the gas outlet 29, while the remainder indicated at 23–bb, lining the upper surface of the arch 21, extend thereafter rearwardly and upwardly across a lower inclined surface of the passage 28 and then vertically upwards, in staggered array, to the roof 27. All the tubes of the group 23b extend forwardly along the roof 27 to a point adjacent the wall 10 and thence to the drum 50.

As shown in Fig. 4, one of the side walls 32 of the furnace 1 is for the most part vertical, but a lower part 32a thereof slopes inwardly and downwardly to form, with a corresponding inwardly and downwardly sloping lower part 2a of the partition wall 2, a hopper shaped bottom part 1a of one of the furnace chambers. Similarly the other furnace chamber is formed with a hopper shaped bottom part 1b.

Steam generating wall cooling tubes 33, shown in Fig. 4 only, are incorporated in each wall 32 and are connected at their lower ends to an inlet header 34 and at their upper ends to an outlet header not shown. The partition wall 2 comprises steam generating furnace cooling tubes 36, shown in Fig. 4, which are connected at their lower ends to inlet headers, such as the header 37, and at their upper ends to an outlet header (not shown). The tubes forming approximately the rearmost third of the wall 2 in extending to the upper outlet headers pass between tubes of the groups 23b and 23–bb to bisect the arch 21. The arrangement is such that gases flowing from the furnace chambers can combine in the gas passage 28 beyond, in the sense of gas flow, the tube screen, formed by the tube group 23a, which extends thereacross.

An ash discharge slot 38 extends across the floor of one furnace chamber between the adjacent lower edges of the partition wall lower part 2a and the lower side wall part 32a and below the slot 38 is disposed a suitable ash collecting chamber 39 of known form. The lower ends of the tubes 33 are spaced apart to provide ports 40 for the discharge of recirculated gas to the chamber 39 and thus through the slot 38 into a location in the furnace chamber remote from the gas outlet therefrom. Lower parts of the tubes 36 are similarly spaced apart to form ports 41 for the same purpose. The hopper shaped bottom part of each furnace chamber is similarly provided with an ash discharge slot, an ash collecting chamber and ports for the recirculation of the furnace gases.

The front wall 10 of the furnace 1 is formed across its width with a large number of ports 42 for the discharge of recirculated gases, as will be described below, at the level of the lower surface of the arch 21, certain of the tubes 11 indicated in Figs. 1 and 5 at 11a being bent forwardly out of the plane of the wall 10 to provide the ports 42.

A radiant superheater 43 arranged in an upper part of the furnace chamber 1 includes a tube platen 44, of nested U-shaped tubes, positioned close to and parallel to the side wall 32, and also includes a number of U-shaped tubes 45 each positioned near the wall 10 with its tube axis lying in a vertical plane extending normally to that of the wall 10, the planes severally containing the axes of the tubes 45 being spaced apart by about 4½" across the front wall 10. Disposed above the furnace chamber roof 27 are an L-shaped inlet header 46 and an L-shaped outlet header 47 and the legs of the U-shaped tubes which lie in the part of the platen 44 nearer the passage 28 are connected to a leg of L-shaped inlet header 46 parallel to the subjacent wall 32, while the legs of the U-shaped tubes which lie in the part of said platen 44 further from the passage 28 are connected to a leg of the L-shaped outlet header 47 parallel to the subjacent wall 32. The legs of the tubes 45 which lie further from the wall 10 are connected to a leg of the L-shaped inlet header 46 parallel to the front wall 10, while the other legs of the said tubes are connected to a leg of the L-shaped outlet header 47 also parallel to the front wall. The outlet header 47 is connected by pipes such as pipe 48 to a spray type attemperator 49 of known construction.

Arranged above the level of the furnace chamber 1 is a horizontal steam and water drum 50 that is provided internally with appropriate steam and water separating means, not shown, and which serves both furnace chambers 1 and 1x. The inlet headers and outlet headers associated with the steam generating tubes of the furnace chamber walls and the partition wall 2 are appropriately connected to the drum 50.

Disposed within the passage 28 is a secondary superheater 53 comprising a large number of sinuously bent tubes 54 each connected at one end to an inlet header 55 and at the other end to an outlet header 56, the headers 55 and 56 being disposed above the roof 27 and inlet header 55 being connected by pipes such as pipe 57 to the attemperator 49. Each tube 54 includes three vertically extending U-shaped loops 54a, 54b and 54c, and the tubes 54 are arranged in groups in such a manner that the loops 54a in a group are nested to form a tube platen 60, the plane of which is parallel to the direction of gas flow through the passage 28. The loops 54b in a group are nested to form a tube platen 61 parallel to platen 60, and the loops 54c in a group are nested to form two sidewardly spaced tube platens 62 each parallel to platens 60. The groups are so formed from the tubes 54 that the platens 60 are spaced apart from one another across the passage 28 by a distance of 22". The platens 61 are similarly spaced apart, and the platens 62 are spaced apart by a distance of 11". Such widely spaced tube platens with their spacing falling in the range 8 to 24", oriented with their planes parallel to the flow of hot gases through the surrounding space absorb heat from the gases mainly by radiation.

Beyond the rearward end of the passage 28 is a gas turning chamber 70 disposed above two vertical downpasses 71 and 72 separated by a division wall 73 which extends in a direction parallel to the plane of front wall 10 so that the downpass 71 is on the side of the downpass 72 remote from the furnace chamber 1.

A roof 75 of the chamber 70, a front wall 76 of downpass 72, a rear wall 77 of the downpass 71, the division wall 73 and side walls 78 and 79 each bounding both the downpasses, and the gas turning chamber are based upon a cage of steam superheating, gas cooling tubes. Thus a steam inlet header 80, disposed above the roof 27 and connected by pipes such as the pipe 81 to the steam space of the drum 50, is connected by tubes 83 which line the roof 75 and the wall 77 to a first transfer header 84 disposed at the foot of wall 77; tubes 85 extend from the inlet header 80 to line part of the roof 75 and to extend downwardly through the chamber 70, where they are spaced apart to permit of gas flow therebetween, to form the basis of the division wall 73, and are connected at their lower ends to a second transfer header 86 disposed at the foot of the wall 73. The tubes 90 connected at their upper ends to the inlet header 80 extend downwardly across the rear end of the passage 28, where they are spaced apart to permit of gas flow therebetween, to line the front wall 76 and are connected to a third transfer header 91 disposed at the foot of the wall 76. Other tubes (not detailed) connected at their upper ends to a steam inlet header 96, itself connected to the inlet header 80, disposed at the same level as header 80 but extending rearwardly at right angles from it, line the side wall 78 and are connected at their lower ends to a fourth transfer header 97 at the foot of wall 78. Similar tubes (not shown) connected at their upper ends to a steam inlet header (not shown) arranged parallel to the header 96 and connected to the header 80, line the wall 79 and are connected at their lower ends to a fifth transfer header (not shown), arranged parallel to the header 97. The spaces between adjacent tubes in each wall of the cage are filled with refractory material, in order to provide gas tight walls, except as specifically mentioned above. The five transfer headers are interconnected by suitable piping, not detailed.

Disposed within the rearward gas downpass 71 is a tubulous convection primary superheater 110 comprising a large number of sinuously bent nested tubes, each nest being shown in the drawings as a single tube 111, each of which nested tubes is connected at its lower end either to the transfer header 84 or to the transfer header 86 and extends to and fro horizontally across the downpass 71 as it rises to the level of the top of the division wall 73, above which it extends vertically adjacent the rear wall 77 towards and through the roof 75 above which it is connected to an outlet header 113. The tubes 111 are, by way of example, of 2½" outside diameter and the horizontal parts of adjacent tubes 111 are spaced apart across the width of the pass 71 on 5" centers.

The outlet header 113 is connected by appropriate pipes such as the pipe 114 to the inlet header 46 of the radiant superheater 43.

Disposed within the downpass 72 is a steam reheater 120 comprising a large number of sinuously bent nested tubes, each nest being indicated in the drawings as a single tube 121, each of which nested tubes is connected at its lower end to an inlet header 130 and extends to and fro horizontally across the downpass 72 as it rises to the level of the top of the division wall 73, above which it first extends upwardly towards and through the roof 75 to supporting means (not shown). Above the roof 75 each tube 121 is reversely bent to re-enter the chamber 70 adjacent the rearward end of the passage 28, the subsequent part 121a within the chamber including series connected U-tube sections with the final leg extending upwardly through the roof 75 above which it is connected to an outlet header 131. The tubes 121 are, by way of example, of 2½" external diameter and the horizontal parts of adjacent tubes 121 are spaced apart across the downpass 72 on 5" centers, and the parts 121a are arranged to form tube platens disposed with their planes parallel to those of the tube platens 60, the platens containing tube parts 121a being spaced apart across the chamber 70 on 7½" centers. Below the parts 121a the tubes 121 are aligned to support a forwardly and downwardly inclined surface 132 arranged to discharge dust falling thereon forwardly into a dust pocket 133.

The superheater tubes 111 extend forwardly and rearwardly of the downpass 71, and the tubes 111 may be supported by attachment at suitable points (not shown) to the tubes 85 of the division wall 73 and to the tubes 83 of the rear wall 77. Similarly, the reheater tubes 120 extend forwardly and rearwardly of the downpass 72, and the tubes 120 may be supported by attachment at suitable points (not shown) to the tubes 85 of the division wall 73 and to the tubes 90 of the front wall 76. The depth of each of the two parallel connected downpasses 71, 72 is so limited by the disposition of one pass on the side of the other remote from the furnace chamber that the horizontal tube lengths of the tubes 111 and 120 do not require support from suspension tubes intermediate their forward and rearward ends.

Below the downpass 71 is arranged a surface 135 sloping rearwardly and downwardly from the foot of the division wall 73 to a short downduct 136, the bottom of which is shaped to provide a hopper 137 for the collection of ash particles, and the forward wall 138 of which is formed with a gas outlet 139 fitted with adjustable dampers 140 and leading to the top of a downpass 141 containing the spaced banks of tubes 142 of a convection economizer. In a similar manner, below the downpass 72 is arranged a surface 145 sloping forwardly and downwardly from the foot of the division wall 73 to a short downduct 146, the bottom of which is shaped to provide a hopper 147 for the collection of ash particles, and the rearward wall 148 of which is formed with a gas outlet 149 fitted with adjustable dampers 150 and leading to the top of the downpass 141. The hoppers 137 and 147 have bottom closures adapted to be periodically opened to permit discharge of collected dust or ash particles.

The bottom of the downpass 141 is formed to provide a hopper 160 and, above the hopper 160, a side wall 161 of the downpass is formed with a port 162 leading to a laterally extending gas duct 163 (see Fig. 3) for the conveyance of gaseous products of combustion to a suitable stack (not shown) by way of an air heater and an induced draft fan. The hopper 160 may be also provided with a periodically opening closure.

The front wall 165 of the downpass 141 is formed, at the level of the port 162, with a smaller port 166 from which a duct 167 leads to the inlet of a gas recirculation fan 168 having an electric driving motor 169 and arranged to discharge gases drawn from the pass 141 through a duct 170 into a manifold 171. If desired, the port 166 may be formed in an upper part of the downpass 141 where it will be effective for the withdrawal of gases which have been cooled by contact with convection vapor heating surfaces but have not passed over the economizer 142. The manifold 171, which includes suitable expansion joints 172 adapted to accommodate thermal expansion of the parts of the manifold, is arranged to supply recirculated gases to branch ducts 174 and 175 respectively connected to the ports 40 and 41 in the ash collecting chamber 39 and to supply recirculated gases to a manifold 177 which extends along the outside of the front wall 10 of furnace chamber 1 and communicates with the ports 42 formed therein. Disposed within the manifold 171 between the gas outlet from the duct 170 and the two branch ducts 174 and 175 is a gas flow controlling damper 180; and a similar damper 181 is disposed in the manifold between the gas outlet from the duct 170 and the branch duct 177.

During operation of the unit described above, pulverized fuel entrained in a stream of primary air is supplied to the burners 14 and 14x and, in each half of the complete unit, gaseous products of combustion rise through the associated furnace chamber 1 or 1x. The hot products of combustion from chamber 1 flow through the passage 28, divide in the chamber 70 into two streams which pass down the downpasses 71 and 72 respectively and rejoin in the upper end of the downpass 141, and then flow down the downpass and through the port 162.

The hot gases passing through the furnace chamber 1 heat, mainly by radiation, the walls thereof, and a mixture of steam and water rises through the wall tubes 11, 23, 33 and 36 and enters the drum 50.

It will be appreciated that drum 50 serves both halves of the boiler unit, and that the following description of the operation of the half of the unit associated with furnace chamber 1 also applies to the half of the unit associated with the furnace chamber 1x.

From the drum 50 saturated steam flows through the pipe 81 to the inlet header 80 of the cage of tubes associated with the gas turning chamber 70 and the downpasses 71 and 72, passing downwardly through the tubes of the cage and absorbing heat and eventually reaching the transfer headers 84 and 86, whence it flows upwardly through the tubes of the primary superheater 110 to the outlet header 113, thence by pipes such as the pipe 114 to the L-shaped inlet header 46 of the radiant superheater 43 disposed in an upper part of the furnace chamber 1. From the outlet header 47 of that superheater, the steam, now superheated, flows through the pipe 48 to the spray type attemperator 49, in which its degree of superheat may be reduced if and as desired. From the attemperator, the superheated steam flows through pipe 57 to the inlet header 55 of the secondary superheater 53 disposed in the passage 28, flowing through the platens of that superheater to the outlet header 56 whence it passes to a steam turbine supplied by the unit.

Steam leaving a high pressure stage of the turbine is returned for reheating to the unit and enters the reheater inlet header 130, passes upwardly through the tubes of the reheater 120 to the outlet header 131 and returns thence to the turbine, entering a lower pressure stage.

Both halves of the unit supply superheated steam to, and reheat steam returned from, the same steam turbine, the steam from outlet header 56 combining with that from its counterpart 56x (for the similar superheater in the companion gaspass 28x) in the steam main leading to the high pressure stage of the turbine, and the reheated steam from outlet header 131 combining with that from its counterpart 131x in the steam main leading to the lower pressure stage of the turbine.

The heat exchange surfaces of the unit shown are so arranged and proportioned that when the associated turbine is operating at or near its full design load, the temperature of the superheated steam leaving the header 56 of the secondary superheater tends to become too high, and the amount of spray water supplied to the attemperator 49 is regulated in a known manner and in accordance with the temperature of the steam leaving the header 56 to maintain that temperature at or near a desired value.

The design of the reheater 120 and the settings of the dampers 140 and 150 are such that the temperature of the reheated steam leaving the reheater 120 reaches a desired optimum value at about full load on the associated turbine.

Should the load on the turbine fall, the load on the unit also falls, and the rate of supply of fuel to the burners 14 is automatically controlled in known manner to compensate for the fall in load.

It is found that when the load on a turbine falls, the temperature of the steam returned to the unit for reheating also falls, and this, together with the decrease in the rate of mass flow of gases over the reheater consequent upon the reduction in the rate of firing of the unit, causes a reduction in the temperature of reheated steam leaving the reheater outlet header 131. In the unit shown, the temperature of the steam leaving the reheater outlet header 131 is kept constant or approximately constant as the load falls by the recirculation of gases which have been cooled by heat transfer therefrom to convection vapor heating surfaces from the lower end of the gas pass 141 to a gas mixing region in an upper part of the furnace chamber 1 adjacent the entrance to the passage 28. Thus when the turbine load falls below full load, the motor 169 associated with the gas recirculating fan 168 is started up and cooled gases withdrawn from the downpass 141 through duct 167 and fed by the fan through duct 170 into the manifold 171. Assuming the damper 180 to be closed, so that no recirculated gases are discharged into the lower end of the furnace chamber 1, the quantity of recirculated gases supplied from the manifold 171 through the manifold 177 to the ports 42 in the front wall 10 of the furnace chamber 1 opposite the arch 21 is controlled by adjustment of the damper 181, either manually or automatically, to maintain the temperature of the reheated steam leaving header 131 at or approximately at the desired optimum temperature. If desired, the variation in the quantity of recirculated gases may be effected by variation of the speed of the electric motor 169.

The effect of this recirculation of cooled gases to a mixing region of the furnace chamber 1 adjacent the inlet to the passage 28 is to lower the temperature, but to increase the mass flow rate, of gases entering the passage 28. The decrease in temperature causes a decrease in the amount of heat extracted radiantly from the gases by the tube platens of the superheaters 43 and 53, while since the superheater 53 receives but little heat by convection from the gases which flow past it, the increased mass flow rate of the gases has but little effect on its rate of heat extraction. As a direct result of the gas recirculation and of the use of radiant vapor heating means in the passage 28, the heat available in the hot gases passing over the convection reheater 120 increases, and in the unit shown it is possible to maintain the temperature of the reheated steam at or approximately at the optimum value over a range of loads extending from approximately one-third of full turbine load up to the turbine full load, by appropriate adjustment of the mass flow rate of the cooled gases recirculated through the ports 42 by adjustment of the damper 181 and of the corresponding damper in the other half of the unit, associated with the furnace chamber 1x.

As the load on the unit falls, the temperature of the superheated steam flowing to the associated turbine from the outlet header 56 of the secondary superheater 53 also tends to fall, and this tendency to fall is accentuated by the use of gas recirculation as has been described above to maintain the temperature of the reheated steam at its optimum value. This is due to the fact that the increase in the heat absorbed in the convection superheater 110 due to the increased mass flow rate of gases over it consequent upon gas recirculation to a region adjacent the furnace gas outlet 29 is less than the decrease in the heat absorbed in the radiant superheaters 43 and 53 due to the reduction of gas temperature consequent upon the recirculation of cooled gases to the ports 42. This tendency for the temperature of the superheated steam to fall is corrected by a reduction of the amount of spray water fed to the attemperator 49 as the load on the unit falls, and in the unit described this is effective over a range of loads extending from full load downwardly to a load at which the amount of spray water supplied to the attemperator 49 reaches zero.

Below this superheat attemperation range of loads, the damper 180 is progressively opened, either manually or automatically, as the load on the unit falls, in order that furnace gases cooled by contact with convection vapor heating surfaces shall be recirculated from the lower end of the pass 141 via the manifold 171, the ports 40 and 41 and the slot 38 to a location of the furnace chamber 1, which chamber forms a radiant vapor generating section of the unit, that is remote from the gas outlet therefrom leading to the passage 28. The effect of this further recirculation of cooled gases is to tend to lower the temperature of the hot gaseous products of combustion rising through the furnace chamber 1 and as a result to reduce the heat absorbed from the gaseous products of combustion by the walls bounding the furnace chamber. The mass flow rate of the gases passing over the convection superheater 110, however, is still further increased and the heat extracted by that superheater will increase. The relationship between the tendency to lower the gas temperature and the increase in mass flow produced by this further recirculation of cooled gases is such that the net effect is that an increase in the amount of the further recirculation causes an increase in the final superheat temperature of steam leaving the unit through the outlet header 56 of the secondary superheater.

Thus, by the recirculation of cooled gases to a location of the furnace chamber 1 remote from the inlet to the gas passage 28, the proportion of the available heat absorbed in vapor heating to that absorbed in vapor generating is increased over a lower range of loads on the unit, and the final temperature of superheat is regulated by control of the said recirculation.

As will be clear to those skilled in the art, the rate of gas recirculation to the region of the furnace chamber adjacent the inlet to the passage 28 may be controlled in accordance with an index other than an index of final temperature of the reheated vapor. If desired, the gas recirculation to the mixing region of the furnace chamber may be controlled in dependence on an index of the load on the unit either alone or together with an index of final temperature of reheat.

In practice, the dampers 140 and 150 may be set to compensate, for example, for discrepancies between predicted and actual performance, variations in cleanliness in heat exchange surfaces of the unit or varying fuel characteristics. At loads above the full load on the associated turbine, the temperature of the reheated steam may tend to become excessively high; if so, it can be reduced by partial closure of the dampers 150. That will further raise the temperature of the superheated steam, but that temperature can be reduced to its optimum value by an increase in the amount of spray water supplied to the attemperator 49. In any case the dampers 140, 150 are so set as to avoid so far as possible draft loss thereacross. The gas recirculation to the mixing region of the furnace chamber 1, adjacent the gas outlet 29, may be so arranged that at full load the recirculation serves to limit the gas temperature at the inlet to the lateral pass to a value at which deposition of slag particles in plastic condition on the secondary superheater surfaces is largely or wholly avoided. Since the recirclulated gases are admitted to the furnace chamber at a position where the rising products of combustion are directed forwardly by the arch 21, good mixing of the hotter and cooler gases is promoted.

It will be seen that with the heat exchange surfaces of the unit arranged as described above, the reheater is disposed in a region of the gas flow path in which it is subjected to relatively low gas temperatures bearing in mind the final temperature of reheat required and the need for reasonable economy of reheater surfaces.

The vapor generating and superheating unit of Fig. 6 is of a general over-all design similar to that of Fig. 1, and much of the preceding description of the Fig. 1 unit will also apply to the Fig. 6 unit. There are, however, quite a number of characteristics by which the Fig. 6 unit differs from the Fig. 1 unit. One of these characteristics relates to the arrangement of the convection surfaces in the downflow parallel gas passes for the reheater and the primary superheater. For example, the tubes forming the successive banks of convection heating tubes of the reheater and the primary superheater are arranged in a particular manner with reference to the arrangement of the soot blowers for those convection surfaces, and the arrangement of the soot blowers is indicated in Fig. 6.

Another distinction between the disclosure of Fig. 6 and the disclosure of Fig. 1 is that the dust hoppers 137 and 147, acting as a continuation of the downflow gas passes are indicated in upwardly telescoping relation to the lower ends of the superposed downflow gas pass construction.

Another distinction between the disclosure of Fig. 6 and Fig. 1 is that Fig. 1 discloses the dust hopper 30 beneath the rearward portion of the secondary superheater, whereas Fig. 6 discloses no dust hopper at this position.

Still another distinction between the disclosures of Fig. 6 and Fig. 1 is that Fig. 1 indicates the two upper horizontal rows of burners 14 as having a spacing, as a group, from the group of the lower two rows of burners, that spacing being greater than the spacing between the two upper rows of burners and the two lower rows.

Fig. 6 shows each tube 121 of the reheater 120 arranged to include a large number of horizontal tube lengths 311 disposed in five banks 312, adjacent horizontal tube lengths 311 being connected by return bends such as the bend 313. Above the level of the top of the division wall 73, the tubes 121 extend to form an upright bank 122 of sinuous tube lengths 123 positioned across the outlet from the lateral pass 28. The bank 122 and the uppermost of the banks 312 are connected by forwardly and downwardly inclined tube lengths 124 upon which is supported the inclined wall 125 arranged to discharge dust falling thereon to a dust pocket 133. Adjacent horizontal tube lengths 311 of the banks 312 are, for example, spaced 6" apart across the width of the pass 72, each of the tubes 121 being of 2½" outside diameter.

Disposed within the rearward gas downpass 71 is a tubulous convection primary superheater 110 comprising a large number of sinuously bent nested tubes, each nest being shown, for simplicity, in Fig. 6 as only a single tube 111 connected at its lower end either to the header 84 or the header 86, and at its upper end, to an outlet header 113. In rising to the level of the top of the division wall 73 each tube 111 is arranged to include a large number of horizontal tube lengths 211 disposed in five spaced tube banks 212 respectively opposite the reheater tube banks 312, adjacent horizontal tube lengths 211 in each tube bank 212 being connected by return bends such as the bend 213. Above the level of the top of the division wall 73 each tube 111 extends vertically adjacent the rear wall 77 toward and through the roof 75 above which it is connected to the outlet header 113. The tubes 111 are, for example, of 2½" outside diameter, the horizontal tube lengths 211 of adjacent tubes having a 6" spacing across the width of the downpass 71.

The outlet header 113 is connected by appropriate pipes such as the pipe 114 to the inlet header 46 of the radiant superheater 43 and the corresponding header of the furnace chamber 1c.

Each of the reheater tube banks 312 is supported by the tubes 85 of the division wall 73 and the tubes 90 of the front wall 76 (Fig. 8), while each of the superheater tube banks 212 is supported, in a manner similar to that utilized for the reheater tube banks 312, by the tubes 83 of the rear wall 77 and the tubes 85 of the wall 73. It will be seen from Figs. 8 and 9 that each bank 312 of nested reheater tubes includes pairs of nested coplanar tube sections 316 and 317 spaced apart across the width of the pass 72. Adjacent the wall 73, each tube section 316 has upper, intermediate and lower return bends 318, 319 and 320 rearwardly of respective upper, intermediate and lower return bends 321, 322 and 323 of the tube section 317 coplanar therewith, while adjacent the front wall 76 each of the tube sections 317 has upper, intermediate and lower return bends 324, 325 and 326 forwardly disposed in relation to respective upper, intermediate and lower return bends 327, 328 and 329 of the tube section 316 coplanar therewith.

For supporting the tube sections 317 bracket members 330 welded to each of the tubes 90 of the wall 76 below the return bends 324 of the tube sections 317 are parts formed in an upper surface 331 thereof with a groove 332 of rectangular cross-section. These grooves are arranged to receive bars 333 which are disposed parallel to the wall 76. Immediately above the bracket members 330 the bars 333 are formed with slots 334 each arranged to receive a bracket member 335 which is complementary with the associated bracket member 330 and which is welded to the return bend 324 at one of the tube sections 317. Each bracket member 335 is formed on its lower surface 336 with a groove 337 of rectangular cross-section having a base 338 which engages within the corresponding slot 334, the base 338 being sufficiently wide to permit movement of the tube section 317 toward the wall 76 which occurs owing to expansion during the heating-up of the unit.

The upper return bends 318 of the tube sections 316 are supported in a similar manner to the bends 324 by bracket members 340 and 341 which are respectively welded to the tubes 85 of the division wall 73 and the return bends 318 of the tube sections 316. Each pair of the members 340 and 341 has a bar 342 disposed therebetween, the arrangement being such as to permit expansion of the tube section 316 which occurs during heating-up of the unit.

For supporting each tube section 317 an auxiliary support 350 is provided for connecting the upper and lower return bends 324 and 326 thereof. This support is disposed rearwardly of the bracket members 330 and 335 and forwardly of the intermediate return bend 325. The auxiliary support 350 comprises lugs 351 and 352 respectively welded to the return bends 324 and 326, and connected by a link 353 which is pinned at opposite ends thereof to the lugs 351 and 352 as by pins 354. An auxiliary support 355 similar to the support 350 serves to connect the upper and lower return bends 318 and 320 of each tube section 316 and is disposed rearwardly of the intermediate return bend 319 and forwardly of the associated bracket members 340 and 341.

Additional suitable positioning means are provided between the tube sections adjacent the return bends. Such means may take the form of spacers or chairs 360 and 363 having upper and lower curved surfaces 361 and 362 respectively in engagement with the adjacent tube surfaces, each chair being welded to the subjacent tube section.

Each of the superheater tube banks 212 is provided with positioning means similar to that of a reheater tube bank 312, the tube bank being supported from the tubes 85 and 83.

For cleaning the reheater tube banks 312 there are, disposed at and normally to the opposite outer walls 78 and 79 of the downpass 72 and at levels respectively between the two uppermost banks 312, between the two banks 312 below the two uppermost banks, and below the lowermost banks 312, respective pairs of opposed soot blowers 400, 401 and 402 (see Fig. 7). The soot blowers are supported upon the structural steel work of the unit and are of the lance type including a discharge element 403 arranged to be projected inwardly from and to be withdrawn to a retracted position and during combined rotary and traversing movement to discharge cleaning fluid. A suitable blower of this type is described in U.S. Patent 2,257,936, of October 7, 1941. The disposition of the soot blowers is such that the linear traversing movement of the discharge elements 403 thereof through corresponding apertures 404 in the walls 78 and 79 is transverse to the horizontal tube lengths 311 of the reheater.

For cleaning the tube banks 212 of the superheater, there are provided three pairs of oppositely arranged soot blowers (not shown), the respective pairs being disposed at the levels of the soot blowers 400, 401 and 402 and each comprising two soot blowers of which one is located adjacent and normally to the wall 78 and is arranged for projection into the pass 71 through an aperture 405, while the other is disposed adjacent and normally to the wall 79 and is arranged for projection into the pass 71 through an aperture (not shown). The soot blowers associated with the pass 71 are of the same type as the blowers 400, 401, 402 and are supported in a manner similar to that adopted for those blowers.

A soot blower of the type set forth is capable of projection through a distance of up to 25 feet, say, so that with soot blowers operating as described, from opposite sides of each of the downpasses 71 and 72, effective cleaning may be achieved with passes having a width of up to 50 feet, while the depth of each pass is limited simply by the maximum dimension of the horizontal tube length which may satisfactorily be used when that tube length is supported only at or adjacent its ends.

The walls dividing the pass 71 would, of course, be perforated for the passage of the soot blower discharge elements which would be effective to clean both the superheater banks and the economizer banks.

Below the downpass 71 is arranged a surface 135 sloping rearwardly and downwardly from the foot of the division wall 73 to a short vertical duct 136 leading to a hopper 137 for the collection of ash particles, and the forward wall 138 of which is formed with a gas outlet 139, fitted with adjustable dampers 140 respectively rotatable about vertical axes and leading to the top of a downpass 141 containing an economizer 142. In a similar manner below the downpass 72 is arranged a surface 145 sloping forwardly and downwardly from the foot of the division wall 73 to a short vertical duct 146 leading to a hopper 147 for the collection of ash particles, and the rearward wall 148 of which is formed with a gas outlet 149 fitted with adjustable dampers 150 and leading to the top of the downpass 141.

The bottom of the downpass 141 is formed to provide a hopper 160 and, above the hopper 160, a side wall 161 of the downpass is formed with a port 162 leading to a laterally extending duct 163 for the passage of gaseous products of combustion to an air heater, an induced draft fan and a stack (not shown) the air heater being associated with a forced draft fan and suitable ducting for the supply of primary and secondary air. At the level of the port 162 side walls 165 of the downpass 141 are formed with similar ports affording communication between the downpass 141 and respective ducts 167 which lead each to the inlet of a gas recirculation fan 168 having an electric driving motor 169 and arranged to discharge gases drawn from the pass 141 through a duct 170 into a manifold 171. Each manifold 171 which includes suitable expansion joints 172 adapted to accommodate thermal expansion of parts of the manifold, is arranged to supply recirculated gases to branch ducts 174 and 175 respectively connected to the ports 40 and 41 in the ash collecting chamber with which the manifold is severally associated and to supply recirculated gases to a further branch duct 177 which extends along the outside of the front wall 10 and communicates with the ports 42 formed therein. Disposed within each manifold 171 between the gas outlet from the duct 170 and the two branch ducts 174 and 175 is a gas flow controlling damper 180; and a similar damper 181 is disposed in the manifold between the gas outlet from the duct 170 and the branch duct 177.

During operation of the unit described, pulverized fuel entrained in a stream of primary air is supplied to the burners 14 and hot gaseous products of combustion rise in parallel streams in the chambers 1c and 1d of the furnace 1 and flow through the passage 28, within which, beyond the rearward end of the partition wall 2 and adjacent the screen formed by the tube group 23a the hot gas streams combine and flow to the gas turning chamber 70 beyond which the hot gases divide into two streams passing down the downpasses 71 and 72 respectively and rejoin in the upper end of the downpass 141 and then flow downwardly through that downpass and through the port 162 or the ports leading to the ducts 167.

A mixture of steam and water rises in the wall tubes of the furnace chambers 1c and 1d and enters the drum 50 from which saturated steam flows by way of pipes 81 and 96a to the respective inlet headers 80 and 96 of the cage of tubes upon which the gas turning chamber 70 and the downpasses 71 and 72 are based. After passing downwardly through the tubes of the cage the steam reaches the transfer headers 84 and 86 from which it flows upwardly through the tubes of the primary superheater 110 to the outlet header 113 thence by way of the pipe 114 to the inlet header 46 of the radiant superheater 43, through that superheater to the outlet header 47 thereof and, by way of pipe 48, to the spray attemperator 49, in which the degree of superheat may be moderated. From the attemperator, the superheated steam flows through pipe 57 to the inlet header 55 of the secondary superheater 53 and through that superheater to the outlet header 56 thereof, whence it passes to a steam turbine supplied by the unit.

Steam leaving a high pressure stage of the turbine is returned for reheating to the unit and enters the reheater inlet header 130, passes upwardly through the tubes of the reheater 120 to the outlet header 131 and returns thence to a low pressure stage of the turbine.

When it is desired to clean the horizontal tube banks 212 and 312 within the downpasses 71 and 72, the blowers associated with each of these passes at the level of the blowers 400 are first operated so that deposits dislodged from the uppermost pair of superheater or reheater tube banks 212 or 312 descend to one of the hoppers 137 or 147 or lodge upon tube surfaces below the associated, uppermost pair of tube banks 212 or 312. Subsequently, all the soot blowers at the level of the blowers 401 (Fig. 7) are operated and then all the soot blowers at the level of the blowers 402 are operated, the deposits dislodged in these operations being eventually collected in the hopper 137 or the hopper 147 from which periodic removal of deposited matter is effected.

The provision of the gas recirculation system makes for increased cleanliness of the convectively heated surfaces of the unit since the lowering of the temperature of the gaseous products of combustion effected by recirculation below the attemperation range of loads tends to lower the temperature of deposit forming particles contained in the products of combustion thereby limiting the tendency of these particles to adhere to the tube surfaces beyond the gas outlet 29. The operation of the Fig. 6 unit, and the pertinent control of superheat and reheat temperatures over a wide load range is similar to the previously described manner of operation of the Fig. 1 unit.

Although the invention has been described with reference to the details of preferred embodiments, it is to be understood that the invention is not to be considered as limited to all of the details thereof. It is rather to be taken as of a scope commensurate with the scope of the subjoined claims. Certain structural features disclosed and claimed in this application are also disclosed in my copending prior application, Serial No. 403,504, filed Jan. 12, 1954, now Patent No. 2,905,154.

What is claimed is:

1. A tubulous vapor generating and vapor heating unit having a radiant vapor generating section including a furnace chamber with vapor generating wall cooling tubes, means forming a gas pass for the flow of gases from the furnace chamber, superheating means with tubes relatively widely spaced across gas flow in the gas pass, transversely extending vertical wall means beyond said superheating means dividing the gas pass into a pair of parallel upright sub-passes, one of said sub-passes being arranged at the side of the other sub-pass remote from said furnace chamber, further convection superheating means and convection reheating means disposed in the sub-passes with their tubes relatively narrowly spaced across gas flow, at least the predominant proportion of the heating surface in one sub-pass being formed by the reheating means, damper means for controlling gas flow distribution between the sub-passes, and means for recirculating furnace gases cooled by contact with convection vapor heating surfaces to a gas mixing region adjacent the inlet to the said gas pass.

2. A tubulous vapor generating and vapor heating unit having a radiant vapor generating section including a furnace chamber with vapor generating wall cooling tubes, means forming a gas pass for the flow of gases from the upper region of the furnace chamber, the furnace chamber having an inwardly projecting arch beneath the inlet of the gas pass, superheating means having tubes relatively widely spaced across the gas flow in the gas pass, transversely extending vertical wall means dividing the gas pass beyond said superheating means into a pair of parallel upright sub-passes, one of said sub-passes being arranged at the side of the other sub-pass remote from said furnace chamber, further convection superheating means and convection reheating means disposed in the sub-passes with their tubes relatively narrowly spaced across gas flow, damper means for controlling gas flow distribution between the sub-passes, at least the predominant proportion of the heating surface in one sub-pass being formed by the reheating means, and means for recirculating furnace gases cooled by contact with the convection vapor heating surfaces to a gas mixing region adjacent the inlet to the said gas pass and in front of the arch.

References Cited in the file of this patent

UNITED STATES PATENTS

| | | |
|---|---|---|
| 2,247,884 | Kerr et al. | July 1, 1941 |
| 2,412,568 | Donahue et al. | Dec. 17, 1946 |
| 2,560,063 | Armacost | July 10, 1951 |
| 2,628,598 | Van Brunt | Feb. 17, 1953 |
| 2,649,079 | Van Brunt | Aug. 18, 1953 |
| 2,685,279 | Caracristi | Aug. 3, 1954 |
| 2,722,033 | Glinn et al. | Nov. 1, 1955 |
| 2,781,746 | Armacost et al. | Feb. 19, 1957 |

FOREIGN PATENTS

| | | |
|---|---|---|
| 515,878 | Belgium | Dec. 15, 1952 |
| 525,796 | Belgium | Feb. 15, 1954 |
| 1,068,954 | France | Feb. 10, 1954 |